(12) United States Patent
Exposito Ledesma

(10) Patent No.: US 10,624,424 B2
(45) Date of Patent: Apr. 21, 2020

(54) FOOT MEASURING MACHINE WITH USER INTERFACE AND CORRESPONDING METHOD

(71) Applicant: Montserrat Exposito Ledesma, Tarragona (ES)

(72) Inventor: Montserrat Exposito Ledesma, Tarragona (ES)

( * ) Notice: Subject to any disclaimer, the term of this patent is extended or adjusted under 35 U.S.C. 154(b) by 175 days.

(21) Appl. No.: 15/575,205

(22) PCT Filed: May 17, 2016

(86) PCT No.: PCT/EP2016/061011
§ 371 (c)(1),
(2) Date: Nov. 17, 2017

(87) PCT Pub. No.: WO2016/184849
PCT Pub. Date: Nov. 24, 2016

(65) Prior Publication Data
US 2018/0146747 A1  May 31, 2018

(30) Foreign Application Priority Data
May 18, 2015  (ES) .................................. 201500360

(51) Int. Cl.
*G06Q 30/00* (2012.01)
*A43D 1/02* (2006.01)
(Continued)

(52) U.S. Cl.
CPC ................ *A43D 1/025* (2013.01); *A43B 7/14* (2013.01); *A43B 17/00* (2013.01);
(Continued)

(58) Field of Classification Search
CPC ........... G06Q 30/0621; G06Q 30/0625; A43D 1/025; A43B 7/14; A43B 17/00; G05B 19/4099; G05B 2219/49023; A61B 5/103
See application file for complete search history.

(56) References Cited

U.S. PATENT DOCUMENTS 5,128,880 A  *  7/1992  White .................. A61B 5/1036
                                                     33/512
5,195,030 A  *  3/1993  White .................. A43D 119/00
                                                     705/27.2
(Continued)

OTHER PUBLICATIONS

McPoil, T. G. "Athletic footwear: design, performance and selection issues." Journal of Science and Medicine in Sport 3 (3): 260-267. (Year: 2000).*

(Continued)

*Primary Examiner* — Naeem U Haq
(74) *Attorney, Agent, or Firm* — Entralta P.C.; Justin G. Sanders; Peter D. Weinstein

(57) ABSTRACT

While purchasing shoes via an online shopping store, a user may use a foot measuring machine according to the invention to automatically download and print an insole which is adapted to the particular user's foot dimensions as well as the particular shoe which is being bought. Hence, a different insole is printed for every different user foot and shoe combination. This enables the user to try out the insole (or insoles for both feet) and make out an idea of the adaptability of the particular shoe to their feet. The foot measuring machine with a user interface facilitates the user the virtual purchase of shoes, generating an insole of the shoe it wants to purchase, so that the user can print the insole of the selected shoe and try it out by super-posing the foot on the insole outline.

13 Claims, 6 Drawing Sheets

(51) Int. Cl.
*A43B 7/14* (2006.01)
*A43B 17/00* (2006.01)
*G05B 19/4099* (2006.01)
*G06Q 30/06* (2012.01)

(52) U.S. Cl.
CPC ..... *G05B 19/4099* (2013.01); *G06Q 30/0621* (2013.01); *G06Q 30/0625* (2013.01); *G05B 2219/49023* (2013.01)

(56) References Cited

U.S. PATENT DOCUMENTS

| | | | |
|---|---|---|---|
| 7,577,583 B2 * | 8/2009 | Litke | G06Q 10/087 705/26.5 |
| 9,460,557 B1 * | 10/2016 | Tran | B29C 64/386 |
| 10,021,939 B2 * | 7/2018 | Andon | A43B 23/0205 |
| 2002/0035793 A1 * | 3/2002 | Byrd | A43B 1/0072 36/8.4 |
| 2003/0110095 A1 * | 6/2003 | Danenberg | A43D 1/02 705/26.64 |
| 2004/0133431 A1 * | 7/2004 | Udiljak | A43B 7/141 705/26.1 |
| 2005/0049816 A1 | 3/2005 | Oda et al. | |
| 2005/0071242 A1 * | 3/2005 | Allen | G06Q 10/087 705/26.5 |
| 2009/0247909 A1 | 10/2009 | Mukumoto | |
| 2010/0030657 A1 * | 2/2010 | Chen | G06Q 30/06 705/26.1 |
| 2010/0130830 A1 | 5/2010 | Lin | |
| 2011/0055053 A1 | 3/2011 | Rutschmann | |
| 2015/0237966 A1 * | 8/2015 | Langmeier | B29D 35/122 12/146 L |
| 2016/0125499 A1 * | 5/2016 | Gooch | G06Q 30/0631 705/26.7 |

OTHER PUBLICATIONS

Gurvinder Singh Gandu "A Comprehensive Guide to Choosing the Best OTC Orthotics for You" Retrieved from https://www.complex.com/sneakers/2013/12/comprehensive-guide-choosing-best-otc-orthotics (Year: 2013).*

International Search Report and Written Opinion, PCT/EP2016/061011, dated Jul. 15, 2016.

* cited by examiner

FOOT MEASURING MACHINE WITH USER INTERFACE AND CORRESPONDING METHOD

This application is a 35 U.S.C. § 371 US national stage entry of International Application number PCT/EP2016/061011, filed May 17, 2016, and claims priority and is entitled to the filing date of ES application number 201500360, filed on May 18, 2015. The contents of the aforementioned applications are incorporated by reference herein.

The present invention refers to user interfaces for the measurement of feet to obtain the foot sizes by means of computer equipment and a mechanical application. The invention refers to obtaining an insole using user graphical interfaces in conjunction with the mechanical and computer applications.

In particular, the computer application invention is to permit the client or user, wanting to purchase a shoe online, to choose his selected foot size and try it out without having it physically, that is, the user would select the brand, model, foot size, and would have access to a graphical interface from which the insole of that particular shoe may be printed, precisely the one the client-user wants to purchase.

One of the largest inconveniences for the buyer of online shoes is the uncertainty of whether the size requested online will be the correct one for his foot, and currently no idea or application is known which solves this inconvenience for the online purchase nor materially facilitates access to the adequate shoes of the particular physical characteristics of each foot.

By means of the present invention, a web computer application whose objective is that the user can virtually try out a shoe, without having the shoe physically, eliminates a series of existing difficulties to date while selecting a shoe to purchase online.

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

Figure 1:
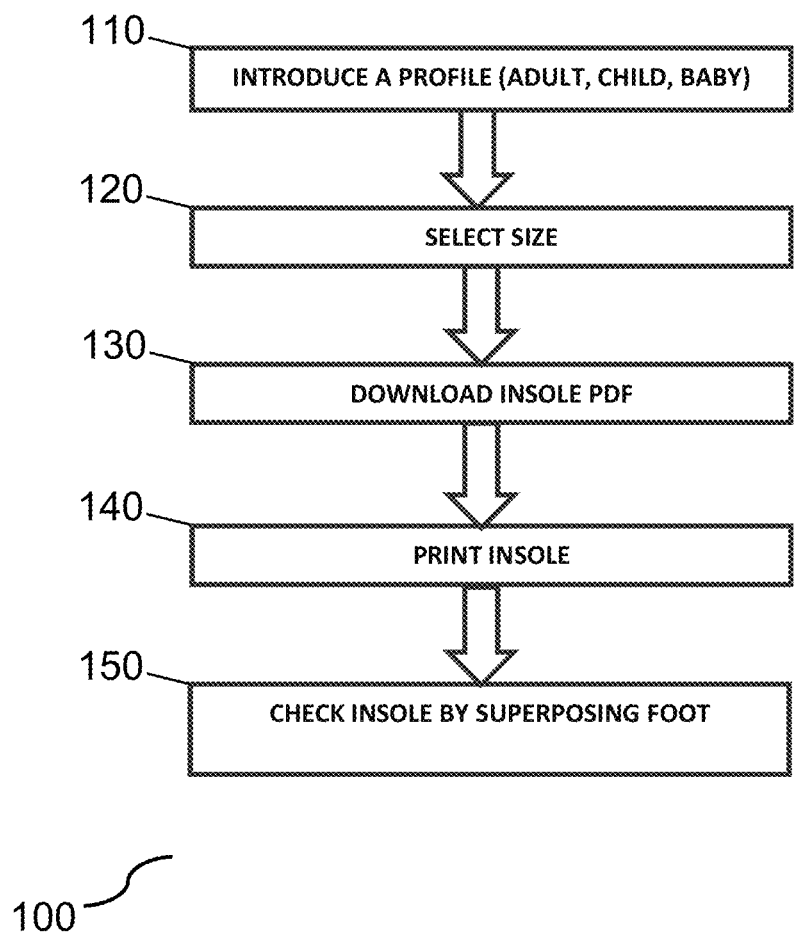
FIG. 1 is flow diagram illustrating an exemplary method for generating a graphical interface, in accordance with at least one embodiment.

The computer application comprises a database that differentiates foot sizes and by means of a graphical interface generates a printable insole corresponding to the selected foot size using any information processing equipment (FIG. 1).

Reference is made to FIG. 1, which depicts the method (100) for generating the graphical interface. The user starts the computer program, choosing (110) a profile of an adult, child or baby (adult size 36-48, child size 25-35 or baby size 18-24), choosing (120) the size, downloading (130) the PDF with the insole and printing (140) the insole.

The web platform or computer program also include a size converter, that is, a table of country equivalencies; with measurements in centimeters and also by country, Europe, USA, United Kingdom, Brazil, Mexico, Japan and Australia, all of them with their corresponding sizes.

The convenience for the user is an important factor. Especially, it has particular importance in applications meant for medium purchase power users and for its frequent use. Recently, the graphical user interfaces and the operating systems enable a great number of people to have computer applications at hand, and following this trend, the computer application is programmed in the MVC.NET platform using C++ and ASP.NET and with a server side operating system Windows Server 2012 R2 with IIS 8, while any browsing system will provide a graphical interface on the user side by means of the MEDI˜SHOES platform.

The web application's objective is that any user can virtually try out a shoe without having it physically. Therefore the user inserts (110, 120) a profile (if it is a child, man or woman, and the shoe size used) and obtains (130) a document with the insole outline for the foot profile introduced.

The user can print (140) the document and verify (150) that the size is the adequate one by superposing the foot on the outline.

The present invention makes reference also to a machine designed especially for obtaining the dimensions of user feet, and by means of a graphical interface, convert them in shoe insoles with the metric characteristics of the inserted foot.

Figure 2:
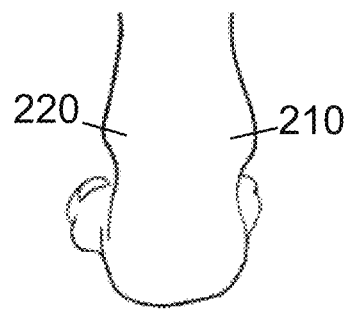
FIGS. 2-4 are perspective views of an exemplary foot, in accordance with at least one embodiment.
Figure 3:
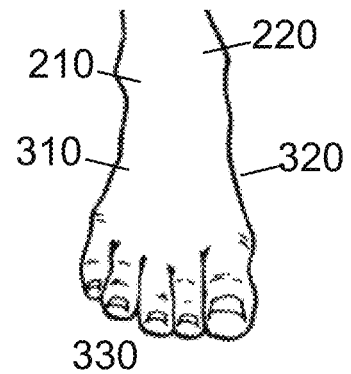
Figure 4:
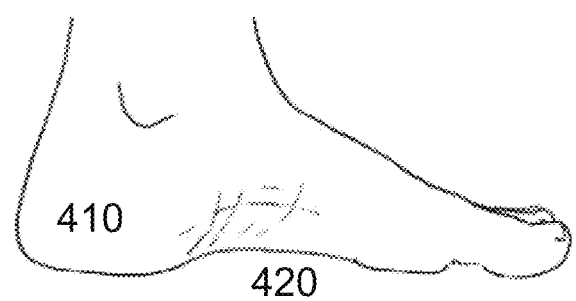

This mechanical application permits obtaining the foot dimensions: the instep, from the line of the ankle region, between the external (210) and internal (220) malleolus till the fingers (330) of the foot, obtaining the measurements till the highest part (FIG. 2); The length of the foot, from the heel (410) to the foot fingers (330), along its external (310) and internal (320) borders (FIG. 3); with the additional input of measuring the internal sole arch (420) (FIG. 4).

With this invention, the mechanical application together with the computer program solves the capturing in an insole of the characteristics and dimensions of any foot and its storage for future use.

Figure 5:
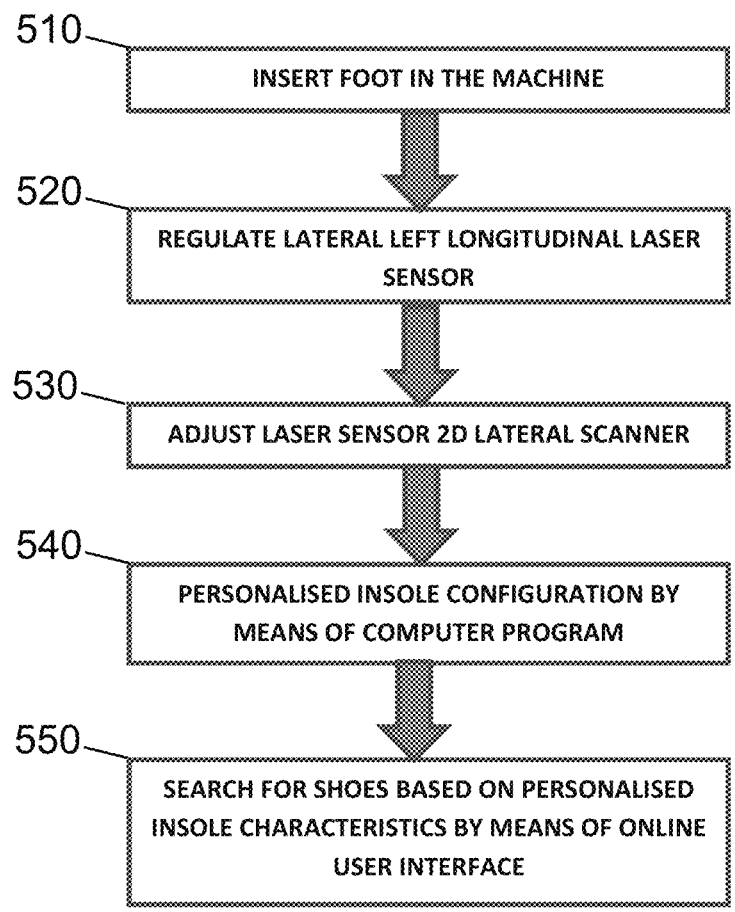
FIG. 5 is a flow diagram illustrating an exemplary method for automatically configuring shoe insoles, in accordance with at least one embodiment.

The mechanical and software interaction permit that when an online buyer wants to purchase a shoe, introducing the foot in the machine for obtaining the dimensions (breadth, height, length), a personalised insole can be produced and, immediately, a specific search can be performed, in correspondence with his insole characteristics, among all the shoes contained in the database of the different manufacturers, brands and models: (FIG. 5, visualisation and selection of models according to the personalised insole using the mechanical application interface).

Therefore, it can be said that this technique, in the mechanical application as well as the computer application, have changed the manner of interacting with the user, as instead of the user selecting manually the model, brand, and size, the user will insert his foot in the mechanical application and the computer application will produce an insole with the graphical interface, performing a search and shoe selection that fits the insole's characteristics.

A practical embodiment has been presented as a non-limiting example, of the machine object of this invention, making reference to the same in the rest of the description.

Figure 6:
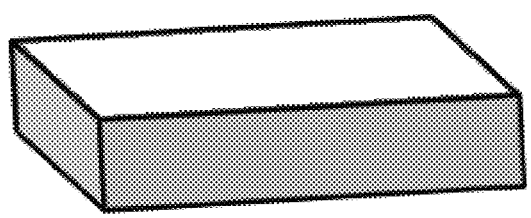
FIG. 6 is a perspective view of an exemplary shoe box, in accordance with at least one embodiment.
Figure 7:
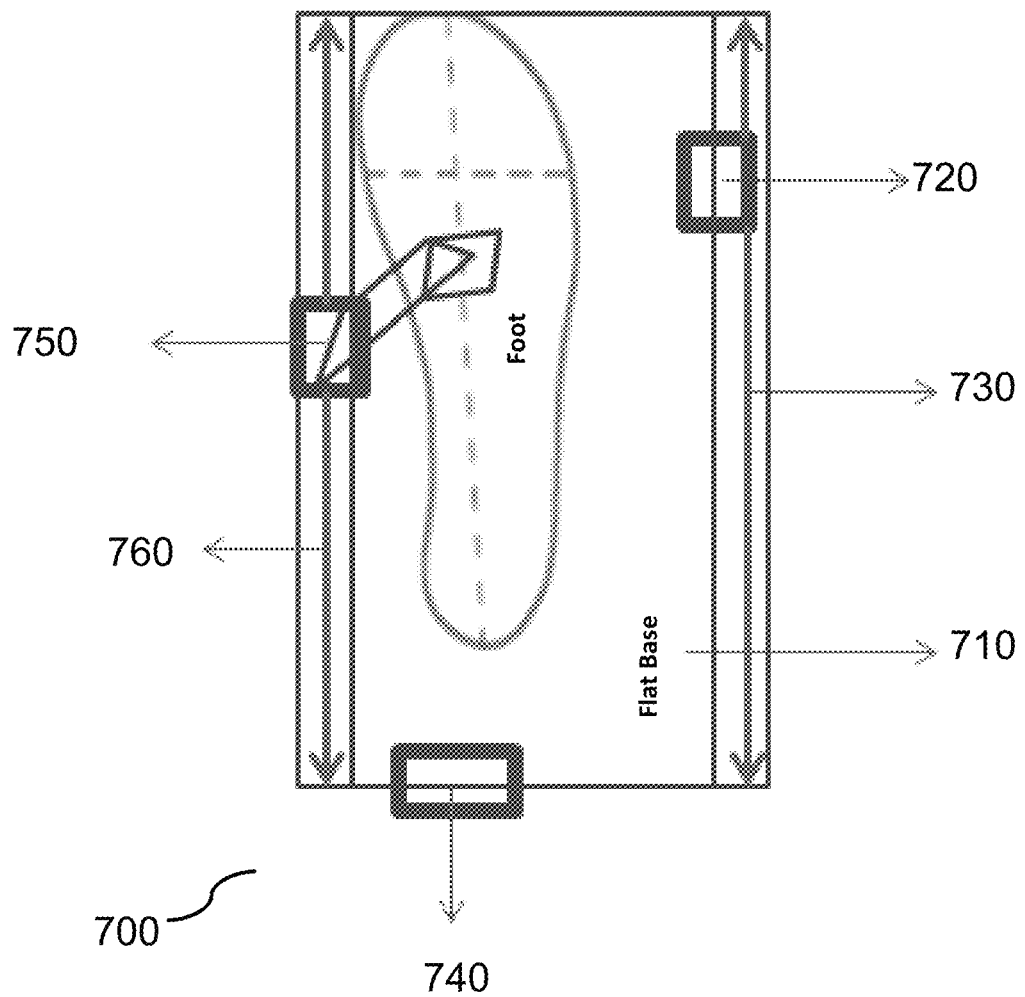
FIGS. 7 and 8 are schematic views of an exemplary foot measuring machine, in accordance with at least one embodiment.
Figure 8:
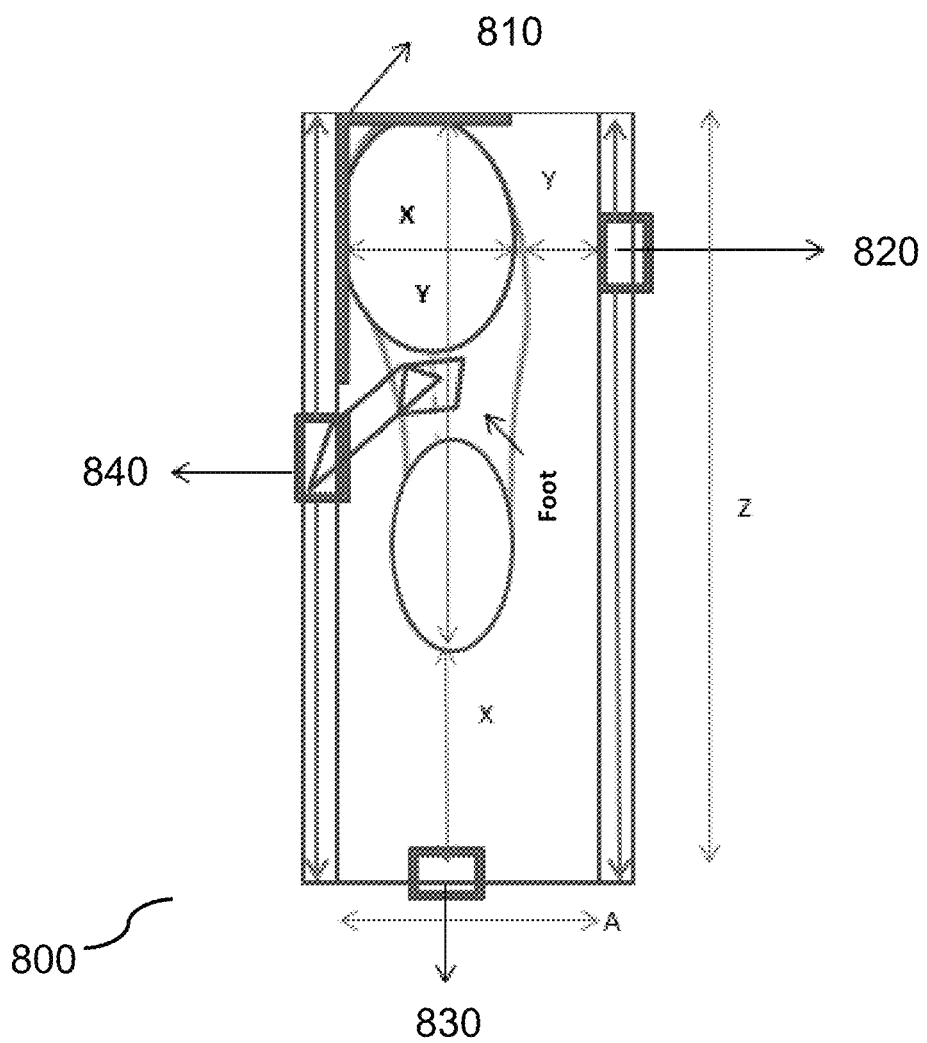

The invention has a rectangular form, such as a shoe box (FIG. 6), composed of sensors and transducers. Following the designs, the machine (700) (FIG. 7) is observed as formed by a flat base (710), a distance laser sensor (720) in its left longitudinal part, which is fixed to an axis with longitudinal movement (730), a distance laser sensor (740) is situated in the back transversal side, a 2D lateral laser scanner (750) is in the right longitudinal part of the machine.

With reference to the flat base (710), the user introduces his foot by the machine's (810) left lateral side with the fingers touching the front transversal side, proceeding to adjust the longitudinal movement measurement laser (820) levelling up to the broadest part of the foot (CM foot breadth (X)=A−Y). The transversal back laser (830) provides the longitudinal dimension of the foot (CM foot length (Y)=Z−X). The laser (840) situated on the right longitudinal part, allows obtaining a profile of the instep in two dimensions when providing a limit in breadth and another in depth (X, Z) (CM instep height=(X, Z)); the distance laser sensors or the triangulation laser sensors being a contactless and frictionless option for measuring distance or displacement.

The machine comprises a data acquisition module for data transmission for channels with PC connectivity via USB and/or WiFi.

The object of the invention being sufficiently described, it should be noted that while implementing it, the forms, dimensions, proportions and disposition of the different elements may vary, as well as the materials used in the elaboration of the machine without altering or modifying its essentiality.

This invention can be implemented in physical shops where shoes are sold in order to know exactly the user foot dimensions, implementing the data base in the company's shoe system, so that the user does not have to try out shoes of different sizes until his adequate size is attained, and to be sure that the foot number for a particular brand or model is the foot number X and be able to shop without even having tried it out. Further, this invention can be used for podiatry and medical uses for the production of 3D insoles, thereby simplifying the task of insole production, as by inserting the foot in the machine one obtains the three-dimensional details of the same.

In summary, in one aspect of the invention, while purchasing shoes via an online shopping store, a user may use a foot measuring machine according to the invention to automatically download and print an insole which is adapted to the particular user's foot dimensions as well as the particular shoe which is being bought. Hence, a different insole is printed for every different user foot and shoe combination. This enables the user to try out the insole (or insoles for both feet) and make out an idea of the adaptability of the particular shoe to their feet. If the insoles are not adapted to the user's foot dimensions, the likelihood that the shoe will be uncomfortable is high. On the other hand, if the insoles provide a preliminary foot match, there is less likelihood that the shoe will be uncomfortable. Hence, the user is capable of making an educated decision prior to completing an online purchase, which is very necessary for the cases that every shoe manufacturer, brand, or model may have a wide variety of different structures and formats, making a shoe of a particular size range from highly comfortable to highly uncomfortable. There are corresponding time and energy savings in visiting physical stores also.

In another aspect of the invention, a user may use a foot measuring machine according to the invention to obtain similar advantages while purchasing shoes via a physical shopping store. The physical store would link the machine to its database of warehouse storage items, automatically obtaining more precise user foot dimensions in order to search for the optimum shoe match for that user, and either fetch it from its local stores, or from a remote warehouse.

The invention claimed is:

1. A foot measuring machine for automatically configuring shoe insoles comprising a computer application and a user interface, the foot measuring machine comprising means configured for:
   obtaining user data comprising a user profile, wherein obtaining user data comprises the user introducing his foot in the foot measuring machine and automatically obtaining and storing the user foot three-dimensional details;
   the three-dimensional details comprising the instep, length, and breadth of the sole of the foot, the foot measuring machine comprising laser distance sensors or triangulation laser sensors, which permit the laser sensor adjustment via longitudinal axes, the right laser sensor for the foot breadth, adjusting it to the broadest part of the foot, the laser sensor for the 2D left longitudinal lateral scan, adjusting it to the beginning of the highest part of the instep, and the transversal laser sensor for the length measurement detection;
   performing a search, on a database including insole brands and models of different manufacturers, of shoe insoles based on the user data, and obtaining the shoe insoles with respective dimensions; and
   presenting the shoe insoles with respective dimensions as a paper printout, comprising producing a personalised insole document with the insole outline for the foot corresponding to the user profile based on the user data and selecting the corresponding shoe without the user having to try out different shoe sizes for discovering his foot size dimension to be sure that the foot size for that particular brand and model is right.

2. The foot measuring machine according to claim 1, wherein the user interface receives user data such as a profile of a user among an adult, child, or baby, or a user foot size, or a shoe brand or model.

3. The foot measuring machine according to claim 2, further comprising a shoe size converter with country equivalencies.

4. The foot measuring machine according to claim 1, wherein the machine is a machine for a physical shop, or is a machine for an online shop.

5. The foot measuring machine according to claim 1, wherein the database of insole brands and models of different manufacturers corresponds to a physical shoe shop or to an online shoe shop.

6. The foot measuring machine according to claim 1, applied to the fabrication of 3D insoles for podiatry and medical uses.

7. A method of using a foot measuring machine for automatically configuring shoe insoles, the foot measuring machine comprising a computer application and user interface, the method comprising:
   the foot measuring machine obtaining user data comprising a user profile, wherein obtaining user data comprises the user introducing a foot in the foot measuring machine and the foot measuring machine automatically obtaining and storing the user foot three-dimensional details;
   the three-dimensional details comprising the instep, length, and breadth of the sole of the foot, the foot measuring machine comprising laser distance sensors or triangulation laser sensors, which permit the laser sensor adjustment via longitudinal axes, the right laser sensor for the foot breadth, adjusting it to the broadest part of the foot, the laser sensor for the 2D left longitudinal lateral scan, adjusting it to the beginning of the highest part of the instep, and the transversal laser sensor for the length measurement detection;

the foot measuring machine performing a search, on a database including insole brands and models of different manufacturers, of shoe insoles based on the user data, and obtaining the shoe insoles with respective dimensions; and the foot measuring machine presenting the shoe insoles with respective dimensions as a paper printout, comprising producing a personalised insole document with the insole outline for the foot corresponding to the user profile based on the user data and selecting the corresponding shoe without the user having to try out different shoe sizes for discovering his foot size dimension to be sure that the foot size for that particular brand and model is right.

8. The method according to claim 7, wherein the user interface receives user data such as a profile of a user among an adult, child, or baby, or a user foot size, or a shoe brand or model.

9. The method according to claim 8, further comprising a shoe size converter with country equivalencies.

10. The method according to claim 7, wherein the machine is a machine for a physical shop, or is a machine for an online shop.

11. The method according to claim 7, wherein the database of insole brands and models of different manufacturers corresponds to a physical shoe shop or to an online shoe shop.

12. The method according to claim 7, applied to the fabrication of 3D insoles for podiatry and medical uses.

13. A foot measuring machine for automatically configuring shoe insoles, the foot measuring machine comprising:
 a computer application and a corresponding user interface; and
 laser distance sensors or triangulation laser sensors, which permit the laser sensor adjustment via longitudinal axes, the right laser sensor for the foot breadth, adjusting it to the broadest part of the foot, the laser sensor for the 2D left longitudinal lateral scan, adjusting it to the beginning of the highest part of the instep, in particular abutting the ankle, and the transversal laser sensor for the length measurement detection;
 wherein the foot measuring machine is configured for:
  obtaining and storing as user data select three-dimensional details associated with a user's foot, upon said user introducing said foot into the foot measuring machine, said three-dimensional details including an instep, a length, and internal arch of a sole of said foot;
  performing a search of shoe insoles based on the user data, and obtaining the shoe insoles with respective dimensions; and
  presenting the shoe insoles with respective dimensions for their visualization to a user interface, or as a paper printout using information processing equipment, or for electronic transmission.

* * * * *